(12) United States Patent
Ogawa

(10) Patent No.: US 12,266,227 B2
(45) Date of Patent: Apr. 1, 2025

(54) VEHICLE WITH OIL INSULATION PERFORMANCE DETECTION

(71) Applicant: TOYOTA JIDOSHA KABUSHIKI KAISHA, Toyota (JP)

(72) Inventor: Masashi Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/323,785

(22) Filed: May 25, 2023

(65) Prior Publication Data

US 2023/0386272 A1    Nov. 30, 2023

(30) Foreign Application Priority Data

May 30, 2022   (JP) ................................. 2022-088004

(51) Int. Cl.
| | |
|---|---|
| *B60K 6/445* | (2007.10) |
| *G07C 5/08* | (2006.01) |
| *H02K 7/00* | (2006.01) |
| *H02K 7/116* | (2006.01) |
| *H02K 9/19* | (2006.01) |

(52) U.S. Cl.
CPC ............ *G07C 5/0816* (2013.01); *B60K 6/445* (2013.01); *H02K 7/006* (2013.01); *H02K 7/116* (2013.01); *H02K 9/19* (2013.01); *B60Y 2200/92* (2013.01); *B60Y 2306/03* (2013.01); *B60Y 2400/307* (2013.01); *B60Y 2400/3084* (2013.01); *B60Y 2400/90* (2013.01)

(58) Field of Classification Search
CPC ........ B60K 6/445; H02K 7/006; H02K 7/116; B60Y 2200/92; B60Y 2306/03
See application file for complete search history.

(56) References Cited

U.S. PATENT DOCUMENTS

2018/0079990 A1    3/2018   Aoyama

FOREIGN PATENT DOCUMENTS

| | | | |
|---|---|---|---|
| CN | 205753607 U | * | 11/2016 |
| CN | 212171939 U | * | 12/2020 |
| JP | 2008154426 A | * | 7/2008 |
| JP | 2016-194002 A | | 11/2016 |
| JP | 2018-031646 A | | 3/2018 |
| JP | 2018-048957 A | | 3/2018 |
| JP | 2018-154426 A | | 10/2018 |

* cited by examiner

*Primary Examiner* — Edwin A Young
(74) *Attorney, Agent, or Firm* — Oliff PLC

(57) ABSTRACT

A vehicle includes: (a) drive wheels; (b) an electric motor serving as a power source for driving the vehicle; (c) a power transmission apparatus configured to transmit a power of the electric motor toward the drive wheels; (d) an electric-insulation-performance determining portion configured to determine an electric insulation performance of an oil supplied to the electric motor and a lubrication required portion of the power transmission apparatus; and (e) a notification portion configured to notify a driver of the vehicle about the electric insulation performance of the oil which is determined by the electric-insulation-performance determining portion.

5 Claims, 4 Drawing Sheets

VEHICLE WITH OIL INSULATION PERFORMANCE DETECTION

This application claims priority from Japanese Patent Application No. 2022-088004 filed on May 30, 2022, the disclosure of which is herein incorporated by reference in its entirety.

FIELD OF THE INVENTION

The present invention relates to a vehicle including at least an electric motor as a power source for driving the vehicle.

BACKGROUND OF THE INVENTION

In a vehicle such as an electric vehicle and a hybrid electric vehicle, which includes at least an electric motor as a power source for driving the vehicle, an oil, which is used for cooling the electric motor and lubricating a power transmission apparatus configured to transmit a power of the electric motor toward the drive wheels, is required to have an appropriate electric insulation performance. For example, an oil having an excellent electric insulation performance, as disclosed in JP-2016-194002A, is used in such a vehicle.

SUMMARY OF THE INVENTION

By the way, in a case in which an oil having a low insulation performance is used in the vehicle, some of an electric current is likely to leak into the oil, there is a risk that a running performance of the vehicle could be reduced. In such a case, it is preferable to notify a driver of the vehicle that the used oil has the low insulation performance.

The present invention was made in view of the background art described above. It is therefore an object of the present invention to provide a vehicle which includes at least an electric motor as a power source and which is capable of notifying a driver of the vehicle that an oil used in the vehicle has a low insulation performance in a case in which the insulation performance of the oil is low.

The object indicated above is achieved according to the following aspects of the present invention.

According to a first aspect of the invention, there is provided a vehicle comprising: drive wheels; an electric motor serving as a power source for driving the vehicle; a power transmission apparatus configured to transmit a power of the electric motor toward the drive wheels; an electric-insulation-performance determining portion configured to determine an electric insulation performance of an oil supplied to the electric motor and a lubrication required portion of the power transmission apparatus; and a notification portion configured to notify a driver of the vehicle about the electric insulation performance of the oil which is determined by the electric-insulation-performance determining portion.

According to a second aspect of the invention, in the vehicle according to the first aspect of the invention, in addition to the electric motor, there is provided an engine serving as another power source for driving the vehicle. In a driving state of the vehicle in which a power of the engine is distributed to the electric motor and a rotary member that is mechanically connected to the drive wheels, the electric-insulation-performance determining portion is configured to determine that the electric insulation performance of the oil is low when a torque ratio, which is calculated by dividing a sum of an estimated torque of the electric motor and an estimated torque of the rotary member by an estimated torque of the engine, is not lower than a first threshold value that is higher than 1.0.

According to a third aspect of the invention, in the vehicle according to the first or second aspect of the invention, the electric-insulation-performance determining portion is configured to determine the electric insulation performance of the oil, from a relationship between an output torque of the electric motor and an estimated torque of the electric motor that is calculated based on an applied current applied to the electric motor.

According to a fourth aspect of the invention, in the vehicle according to the third aspect of the invention, the electric-insulation-performance determining portion is configured to determine that the electric insulation performance of the oil is low when a torque ratio, which is calculated by dividing the estimated torque of the electric motor by the output torque of the electric motor, is not lower than a first threshold value that is higher than 1.0.

According to a fifth aspect of the invention, in the vehicle according to the second or fourth aspect of the invention, the notification portion is configured, when the torque ratio is not lower than the first threshold value, to notify the driver of the vehicle that the electric insulation performance of the oil is low.

According to a sixth aspect of the invention, in the vehicle according to the fifth aspect of the invention, an applied current applied to the electric motor is reduced when the torque ratio is not lower than a second threshold value that is higher than the first threshold value.

In the vehicle according to the present invention, the electric insulation performance of the oil is determined by the electric-insulation-performance determining portion, and the determined electric insulation performance of the oil is notified by the notification portion to the driver of the vehicle, so that the driver can grasp whether the electric insulation performance of the oil is appropriate or not.

DETAILED DESCRIPTION OF PREFERRED EMBODIMENTS

There will be described embodiments of the present invention in details with reference to drawings. It is noted that figures of the drawings are simplified or deformed as needed, and each portion is not necessarily precisely depicted in terms of dimension ratio, shape, angle, etc, for easier understanding of the embodiments.

First Embodiment

Figure 1:
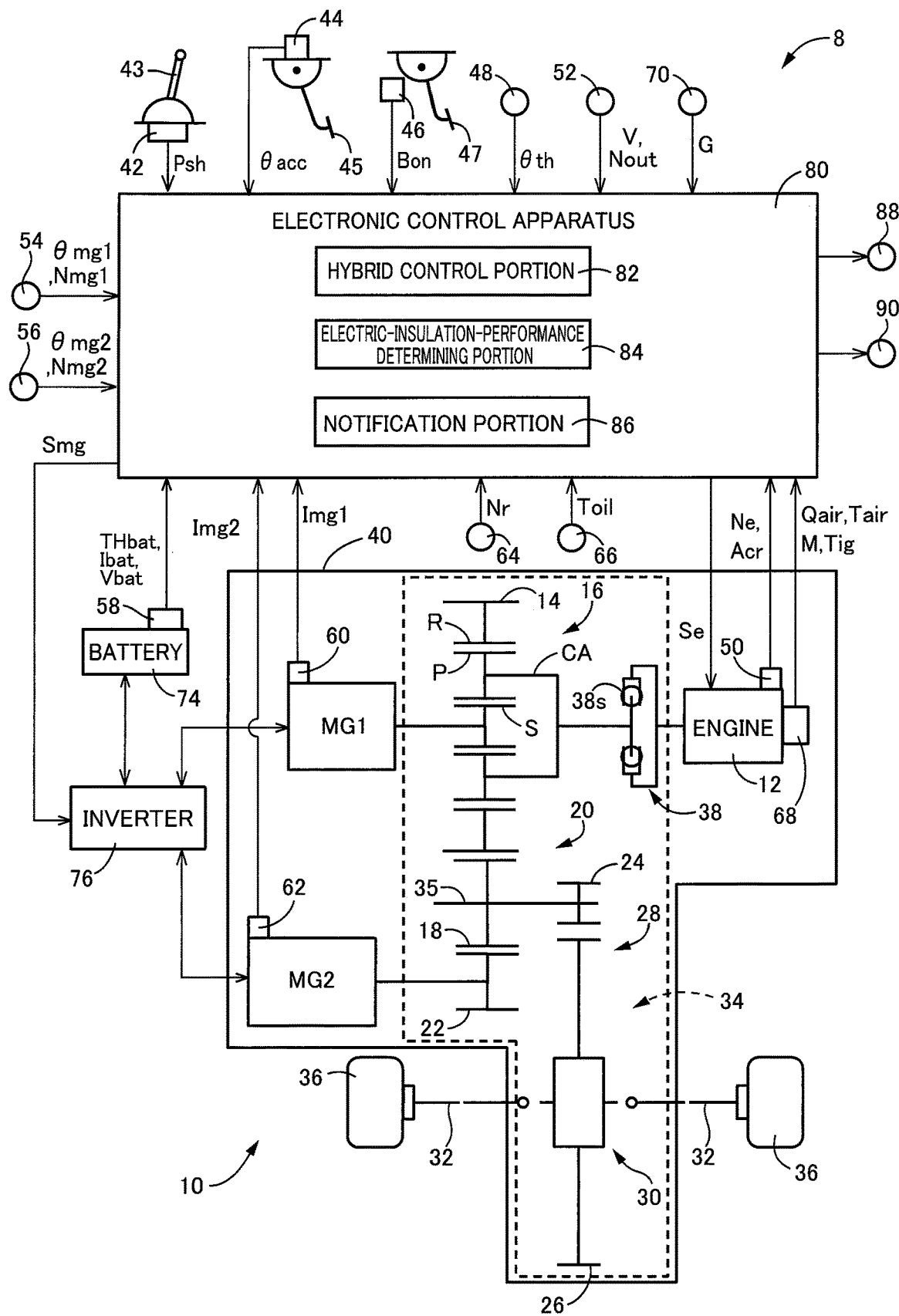
FIG. 1 is a view schematically showing a construction of a hybrid electric vehicle to which the present invention is applied, and is also a functional block diagram explaining a control system and control functions for performing various controls in the vehicle.

FIG. 1 is a view schematically showing a construction of a hybrid electric vehicle 8 to which the present invention is applied, and is also a functional block diagram explaining a control system and control functions for performing various controls in the vehicle. The vehicle 8 includes an engine 12 and a second electric motor MG2 as power sources for driving the vehicle 8, and a power transmission apparatus 10 configured to transmit powers of the engine 12 and the second electric motor MG2 toward drive wheels 36 of the vehicle 8. The power transmission apparatus 10 includes a power distribution mechanism 16, a pair of counter gears 20, the above-described second electric motor MG2, a pair of final gears 28, a differential gear device 30 and right and left axles 32, which are disposed within a casing 40. The power distribution mechanism 16 is provided to distribute the power outputted from the engine 12, to the first electric motor MG1 and a counter drive gear 14. The pair of counter gears 20 are constituted by the counter drive gear 14 and a counter driven gear 18 meshing with the counter drive gear 14. The second electric motor MG2 is connected to the counter driven gear 18 through a reduction gear 22 in a power transmittable manner. The pair of final gears 28 are constituted by a differential drive gear 24 and a differential driven gear 26. The power transmission apparatus 10 is advantageously provided in an FF (front engine and front drive) type vehicle in which the power transmission apparatus 10 is disposed transversally. The counter driven gear 18 and the differential drive gear 24 are mounted on a counter shaft 35 so as to be unrotatable relative to the counter shaft 35. It is noted that each of the first and second electric motors MG1, MG2 corresponds to "electric motor" recited in the appended claims.

In the power transmission apparatus 10, the power of the engine 12 is transmitted to the counter driven gear 18 through the power distribution mechanism 16 and the counter drive gear 14, while the power of the second electric motor MG2 is transmitted to the counter driven gear 18 through the reduction gear 22. The power transmitted to the counter driven gear 18 is transmitted to the right and left drive wheels 36 sequentially through the pair of final gears 28, differential gear device 30 and right and left axles 32. Thus, the power transmission apparatus 10 is capable of transmitting the power of each of the engine 12 and the second electric motor MG2 toward the drive wheels 36.

A damper device 38 is provided between the engine 12 and the power distribution mechanism 16, and includes damper springs 38s. The damper device 38 has a function of absorbing a torque fluctuation, with the damper springs 38s being elastically deformed depending on a torque applied thereto.

The power distribution mechanism 16 is constituted by a known planetary gear device of single pinion gear type, which includes a sun gear S, pinion gears P, a carrier CA supporting the pinion gears P such that each of the pinion gears P is rotatable about its axis and revolvable about a common axis, and a ring gear R meshing with the sun gear S through the pinion gears P. The sun gear S is connected to the first electric motor MG1 in a power transmittable manner. The carrier CA is connected to the engine 12 in a power transmittable manner. The ring gear R is connected to the right and left drive wheels 36 in a power transmittable manner, sequentially through the counter drive gear 14, counter driven gear 18, pair of final gears 28, differential gear device 30 and right and left axles 32, for example. Further, the counter drive gear 14 is connected to the second electric motor MG2 in a power transmittable manner, through the pair of counter gears 20 and reduction gear 22. The ring gear R and the counter drive gear 14 are formed integrally with each other, and cooperate to constitute a compound gear. It is noted that the compound gear providing the counter drive gear 14 corresponds to "rotary member (that is mechanically connected to the drive wheels)" recited in the appended claims.

The above-described sun gear S, carrier CA and ring gear R are rotatable relative to one another. Therefore, the power of the engine 12 can be distributed to the first electric motor MG1 and the counter drive gear 14, and an electric energy is generated by the first electric motor MG1 owing to the power of the engine 12 distributed to the first electric motor MG1, so that the generated electric energy is stored in a battery 74 through an inverter 76, and the second electric motor MG2 is driven by the generated electric energy.

Thus, the power distribution mechanism 16 functions as an electrically continuously-variable transmission, for example, which is placed in a continuously-variable shifting state (electrically established CVT state) in which a rotational speed of the ring gear R provided integrally with the counter drive gear 14 is continuously variable, irrespective of a certain rotational speed of the engine 12. That is, the power distribution mechanism 16 serves as an electric differential portion (electrically continuously-variable transmission portion) in which a differential state of the power distribution mechanism 16 is controlled by controlling an operation state of the first electric motor MG1 serving as a differential electric motor.

In a lower portion of the casing 40 of the power transmission apparatus 10, an oil is stored to lubricate a lubrication required portion 34 that includes various gears and various bearings disposed within the casing 40. This oil stored in the lower portion of the casing 40 is used also for cooling the first and second electric motors MG1, MG2. For example, the differential driven gear 26 is partially immersed in the oil stored in the casing 40, so that the stored oil is scraped up by the differential driven gear 26 during running of the vehicle 8, whereby the oil is supplied to the first and second electric motors MG1, MG2 and the lubrication required portion 34 such as the various gears and the various bearings.

Further, in addition to the supply path of the oil scraped up by the differential driven gear 26, it is possible to provide a cooling circuit (not shown) for cooling the first and second electric motors MG1, MG2, such that the oil pumped up by an oil pump (not shown) is supplied to the first and second electric motors MG1, MG2 via the cooling circuit.

The vehicle 8 includes an electronic control apparatus 80 for performing various controls such as a control for controlling running of the vehicle 8. The electronic control apparatus 80 receives: an output signal of a shift position sensor 42 indicative of a shift operation position Psh of a shift position sensor 42; an output signal of an accelerator opening-degree sensor 44 indicative of an accelerator opening degree θacc as an operation amount of an accelerator pedal 45 which represents an amount of acceleration required to the vehicle 8 by a driver of the vehicle 8 (hereinafter referred to as "vehicle driver"); an output signal of a brake switch 46 indicative of an operation (brake ON) Bon of a foot brake pedal 47 that represents an operation (depression) of a foot brake as a service brake; an output signal of a throttle-valve opening degree sensor 48 indicative of an opening degree θth that is an opening degree of an electronic throttle valve; an output signal of a crank position sensor 50 indicative of a rotational angle Acr of a crankshaft and an engine rotational speed Ne that is a rotational speed of the engine 12; an output signal of an output speed sensor 52 indicative of an output rotational speed Nout that is a rotational speed of the counter drive gear 14 corresponding to a running speed V of the vehicle 8; an output signal of a first resolver 54 indicative of a rotational angle θmg1 (electrical angle) of the first electric motor MG1 and an MG1 rotational speed Nmg1 that is a rotational speed of the first electric motor MG1; an output signal of a second resolver 56 indicative of a rotational angle θmg2 (electrical angle) of the second electric motor MG2 and an MG2 rotational speed Nmg2 that is a rotational speed of the second electric motor MG2; an output signal of a battery sensor 58 indicative of a battery temperature THbat, a battery charging/discharging electric current that and a battery voltage Vbat of the battery 74; an output signal of a first current sensor 60 indicative of an applied current Img1 applied to the first electric motor MG1; an output signal of a second current sensor 62 indicative of an applied current Img2 applied to the second electric motor MG2; an output single of a wheel speed sensor 64 indicative of a rotational speed Nr of each of the wheels of the vehicle 8, an output signal of an oil temperature sensor 66 indicative of an oil temperature Toil of the oil stored in the casing 40; an output signal of an engine-state detection sensor 68 indicative of an operation state of the engine 12 (such as an intake air quantity Qair, an intake air temperature Tair, a fuel injection amount M and an ignition timing Tig); and an output signal of an acceleration sensor 70 indicative of a longitudinal acceleration G of the vehicle 8.

The electronic control apparatus 80 outputs an engine control command signal Se for controlling an output of the engine 12 and a motor control command signal Smg that is to be supplied to the inverter 76 for controlling operations of the first and second electric motors MG1, MG2.

The electronic control apparatus 80 functionally includes hybrid control means in the form of a hybrid control portion 82 for executing a hybrid control of the vehicle 8. The hybrid control portion 82 is configured to selectively establish one of a motor driving mode, an engine driving mode (normal drive mode) and an engine-assisting drive mode, depending upon a running state of the vehicle 8. In the motor driving mode, only the second electric motor MG2 is used as the power source to cause the vehicle 8 to run while the engine 12 is stopped. In the engine driving mode, at least the engine 12 is used as the power source to cause the vehicle 8 to run, such that the directly transmitted torque of the engine 12 is transmitted to the counter drive gear 14, with the first electric motor MG1 being operated as an electric generator so as to generate a reaction force with respect to the force of the engine 12, while the second electric motor MG2 is operated with the electric energy generated by the first electric motor MG1 so as to transmit the torque to the counter driven gear 18. In the engine-assisting drive mode, the second electric motor MG2 is operated with the electric energy supplied from the battery 74, to produce an assisting torque to assist the engine 12 operated in the engine driving mode. Further, the hybrid control portion 82 is configured to cause the engine 12 to be operated in an efficient operation region, and to control a gear ratio γ0 (engine rotational speed Ne/output rotational speed Nout) in the power transmission apparatus 10, by appropriately changing a ratio between drive powers of the engine 12 and the second electric motor MG2 and also the reaction force generated by the first electric motor MG1 operated as the electric generator.

By the way, in the power transmission apparatus 10, a stator coil of each of the first and second electric motors MG1, MG2 (hereinafter collectively referred to as "electric motors MG") is partially immersed in the oil stored in the casing 40. Therefore, where an electric insulation performance of the stored oil is low, leakage of an electric current into the oil could be increased. In such a case, electrical short and spark could occur whereby the oil could be abnormally heated thereby causing a risk leading to a device failure. Further, the electric motors MG could suffer from output reduction thereby causing a risk leading to reductions of running performance and cruising distance of the vehicle 8. However, in the present embodiment, the electronic control apparatus 80 functionally includes an electric-insulation-performance determining portion 84 configured to determine an electric insulation performance of the oil supplied to the electric motors MG and the lubrication required portion 34 during running of the vehicle 8. Further, the electronic control apparatus 80 functionally includes a notification portion 86 configured to notify the vehicle driver of a result of the determination made by the electric-insulation-performance determining portion 84, namely, the electric insulation performance of the oil which is determined by the electric-insulation-performance determining portion 84.

The electric insulation performance of the oil can be determined from a relationship between an MG torque Tmg (Tmg1, Tmg2) as an output torque of each of the electric motors MG and an estimated MG torque Tmgest (Tmg1est, Tmg2est) as an estimated torque of the each of the electric motors MG that is calculated based on the applied current Img (Img1, Img2) applied to the each of the electric motors MG. Where the electric insulation performance of the oil is fine, the estimated MG torque Tmgest (Tmg1est, Tmg2est) of each of the electric motors MG that is estimated from the applied current Img applied to the each of the electric motors MG and the MG rotational speed Nmg (Nmg1, Nmg2) of the each of the electric motors MG is equal or substantially equal to the MG torque Tmg of the each of the electric motors MG that is an actual output torque of the each of the electric motors MG. Therefore, where the electric insulation performance of the oil is fine, a torque ratio (=Tmgest/Tmg), which is defined as a value calculated by dividing the estimated MG torque Tmgest by the MG torque Tmg, is 1.0 or substantially 1.0. On the other hand, where the electric insulation performance of the oil is low, since the leakage of the electric current into the oil is increased, the MG torque Tmg that is the actual output torque of each of the electric motors MG becomes small relative to the estimated MG torque Tmgest of the each of the electric motors MG that is estimated based on the applied current Img applied to the each of the electric motors MG, so that the torque ratio torque ratio (=Tmgest/Tmg) becomes higher than 1.0. The torque ratio RT of each of the electric motors MG is increased as the electric insulation performance of the oil is reduced. Thus, it is possible to determine whether the oil whose insulation performance is low is being used or not, namely, whether the electric insulation performance of the oil is low or not, depending on whether the calculated torque ratio RT is at least a first threshold value K1 that is higher than 1.0. Specifically, when the torque ratio RT of each of the electric motors MG is lower than the first threshold value K1, the electric insulation performance of the oil is fine. When the torque ratio RT of each of the electric motors MG is not lower than the first threshold value K1, the electric insulation performance of the oil is low. The first threshold value K1 is obtained by experimentation or determined by an appropriate design theory, such that it is considered that the electric insulation performance of the oil is within an acceptable range as long as the torque ratio RT is lower than the first threshold value K1.

The estimated MG torque Tmgest of each of the electric motors MG can be calculated from the applied current Img applied to the each of the electric motors MG and the MG rotational speed Nmg of the each of the electric motors MG. The applied current Img1 applied to the first electric motor MG1 can be detected by the first current sensor 60, while the applied current Img2 applied to the second electric motor MG2 can be detected by the second current sensor 62. The MG rotational speed Nmg1 of the first electric motor MG1 can be detected by the first resolver 54, while the MG rotational speed Nmg2 of the second electric motor MG2 can be detected by the second resolver 56. Further, the MG torque Tmg as the output torque of each of the electric motors MG can be detected by a torque sensor provided to detect the MG torque Tmg of the each of the electric motors MG. Thus, the torque ratio RT of each of the electric motors MG can be calculated by providing the torque sensor configured to detect the MG torque Tmg of the each of the electric motors MG, and the electric insulation performance of the oil can be determined based on the calculated torque ratio RT. However, the provision of the torque sensor for each of the electric motors MG leads to increase of the number of required parts or components. Hereinafter, there will be described a method of determining the electric insulation performance of the oil, without using the torque sensor.

In the vehicle 8 that includes the power distribution mechanism 16 configured to distribute the power of the engine 12 toward the first electric motor MG1 and the drive wheels 36, there is a case in which the vehicle 8 is a driving state that satisfies formula (1) given below. In the formula (1), "Te" represents an engine torque of the engine 12, "Tmg1" represents the output torque (i.e., MG1 torque Tmg1) of the first electric motor MG1, and "Td" represents a drive torque Td outputted from the counter drive gear 14 provided integrally with the ring gear R that constitutes the power distribution mechanism 16. It is noted that the drive torque Td of the counter drive gear 14 is equal to a torque outputted from the ring gear R.

$$Te = Tmg1 + Td \quad (1)$$

The formula (1) is satisfied when the above-described engine driving mode is established. The engine driving mode is a drive mode in which at least the engine 12 is used as the power source to cause the vehicle 8 to run, such that the directly transmitted torque of the engine 12 is transmitted to the counter drive gear 14, with the first electric motor MG1 being operated as the electric generator so as to generate the reaction force with respect to the force of the engine 12, while the second electric motor MG2 is operated with the electric energy generated by the first electric motor MG1 so as to transmit the torque to the counter driven gear 18. When the electric insulation performance of the oil is to be determined, firstly, the electric-insulation-performance determining portion 84 determines whether a driving condition satisfying the formula (1) is established or not. The electric-insulation-performance determining portion 84 determines that the driving condition satisfying the formula (1) is established, for example, when all of requirements are satisfied, wherein the requirements consist of, for example, (i) a requirement that the engine 12 is being driven, (ii) a requirement that the MG1 rotational speed Nmg1 of the first electric motor MG1 is a positive value (namely, the first electric motor MG1 in a generative state) and (iii) a requirement that the first electric motor MG1 is not supplying and receiving the electric power to and from the battery 74.

When the driving condition satisfying the formula (1) is established, the electric-insulation-performance determining portion 84 starts a control for determining the electric insulation performance of the oil. The control is started with by calculating the torque ratio RT in accordance with formula (2) given below. In the formula (2), "Teest" represents an estimated engine torque Teest that is an estimated value of the engine torque Te, "Tmg1est" represents an estimated MG1 torque Tmg1est that is an estimated value of the MG1 torque Tmg1 of the first electric motor MG1, and "Tdest" represents an estimated drive torque Tdest that is an estimated value of the drive torque Td outputted from the counter drive gear 14. In the formula (2), the torque ratio RT represents a value calculated by dividing a sum of the estimated values of the MG1 torque Tmg1 and the drive torque Td (to which the engine torque Te is distributed by the power distribution mechanism 16) by the estimated value of the engine torque Te. It is noted that the estimated drive torque Tdest corresponds to "estimated torque of the rotary member" recited in the appended claims.

$$RT = (Tmg1est + Tdest)/Teest \quad (2)$$

In a state without the leakage of the electric current from the electric motor MG into the oil, the MG torque Tmg of each of the electric motors MG is not reduced relative to the applied current Img applied to the each of the electric motors MG, so that the torque ratio RT is 1.0. On the other hand, in a case in which the oil having a low insulation performance is used, the leakage of the electric current from the electric motor MG into the oil is increased. In this case, although the estimated MG torque Tmgest of each of the electric motors MG, which is calculated based on the applied current Img applied to the each of the electric motors MG, is increased with increase of the applied current Img applied to the each of the electric motors MG, the actual MG torque Tmg of the each of the electric motors MG is not increased because of the leakage of the electric current from the each of the electric motors MG. Further, in the driving condition satisfying the formula (1), the estimated engine torque Teest is not increased, either. Consequently, where the electric insulation performance of the oil is low, the sum of the estimated MG1 torque Tmg1est and the estimated drive torque Tdest is higher than the estimated engine torque Teest, so that the torque ratio RT, which is calculated based on the formula (2), is higher than 1.0.

The estimated MG1 torque Tmg1est in the formula (2) is calculated by applying, to a predefined relationship map or relationship formula, the applied current Img1 detected by the first current sensor 60 and the MG1 rotational speed Nmg1 detected by the first resolver 54. The estimated engine torque Teest is calculated by applying, to a predefined relationship map or relationship formula, the engine rotational speed Ne and values detected by the engine-state detection sensor 68 such as the above-described intake air quantity Qair, intake air temperature Tair, fuel injection amount M and ignition timing Tig.

The estimated drive torque Tdest of the counter drive gear 14 in the formula (2) is calculated in accordance with formula (3) given below. In the formula (3), "Tdiffest" represents an estimated differential-gear torque Tdiffest that is an estimated torque of the differential driven gear 26 that constitutes the pair of final gears 28, "γ1" represents a first gear ratio γ1 that is mechanically defined between the counter drive gear 14 and the differential driven gear 26, "Tmg2est" represents an estimated MG2 torque Tmg2est that is an estimated value of the MG2 torque of the second electric motor MG2, and "γ2" represents a second gear ratio γ2 that is mechanically defined between the second electric motor MG2 and the counter drive gear 14. The first gear ratio γ1 is equal to a ratio (=Nd/Ndiff) of a rotational speed Nd of the counter drive gear 14 to a rotational speed Ndiff of the differential driven gear 26. Further, the second gear ratio γ2 is a ratio (=Nd/Nmg2) of the rotational speed Nd of the counter drive gear 14 to the MG2 rotational speed Nmg2 of the second electric motor MG2. It is noted the estimated drive torque Tdest can be more accurately calculated by taking account of also other factors such as the oil temperature Toil of the oil stored in the casing 40.

$$Tdest = Tdiffest/\gamma 1 - Tmg2est/\gamma 2 \tag{3}$$

The estimated differential-gear torque Tdiffest is calculated, for example, by applying the longitudinal acceleration G of the vehicle 8 detected by the acceleration sensor 70 to a predefined relationship map or relationship formula. Further, the estimated MG2 torque Tmg2est is calculated by applying, to a predefined relationship map or relationship formula, the applied current Img2 detected by the second current sensor 62 and the MG2 rotational speed Nmg2 detected by the second resolver 56.

The electric-insulation-performance determining portion 84 calculates the torque ratio RT from the formulas (2), (3), and determines the electric insulation performance based on the calculated torque ratio RT. Where the electric insulation performance of the oil is low, the sum of the estimated MG1 torque Tmg1est and the estimated drive torque Tdest becomes higher than the estimated engine torque Teest. Therefore, where the electric insulation performance of the oil is low, the torque ratio RT is higher than 1.0. The torque ratio RT becomes higher as the electric insulation performance of the oil become lower. Thus, after having calculated the torque ratio RT, the electric-insulation-performance determining portion 84 determines whether the torque ratio RT is at least the first threshold value K1 or not, and determines that the electric insulation performance of the oil is low when the torque ratio RT is not lower than the first threshold value K1. Thus, the electric insulation performance of the oil can be determined based on the torque ratio RT that is calculated from the formula (2) in the driving state satisfying the formula (1), even without provision of the torque sensor. The first threshold value K1 is obtained by experimentation or determined by an appropriate design theory, such that it is considered that the electric insulation performance of the oil is within an acceptable range as long as the torque ratio RT is lower than the first threshold value K1.

When the torque ratio RT is not lower than the first threshold value K1, the notification portion 86 notifies that the oil whose insulation performance is low is being used, namely, the electric insulation performance of the oil is low. The notification portion 86 may be configured to cause a warning light 88, which is provided in a driver's seat, to be turned on, and/or to cause a sounding device 90 to generate a warning sound, for example, so as to notify the vehicle driver that the electric insulation performance is low. Thus, the vehicle driver can acknowledge that the electric insulation performance is low and take an action such as changing the oil to another one.

Where the electric insulation performance of the stored oil is considerably low, the leakage of the electric current into the oil is increased whereby electrical short and spark could be increased whereby the oil could be abnormally heated thereby causing a risk leading to a device failure. Therefore, when the torque ratio RT is at least the first threshold value K1, the electric-insulation-performance determining portion 84 determines whether the torque ratio RT is at least a second threshold value K2 that is higher than the first threshold value K1. The second threshold value K2 is obtained by experimentation or determined by an appropriate design theory, such that it is considered that the electric insulation performance of the oil is low but is within a range in which a normal driving of the vehicle 8 is allowed, when the torque ratio RT is not lower than the first threshold value K1 but is lower than the second threshold value K2. In other words, there is a risk that the oil could be abnormally heated when the torque ratio RT is at least the second threshold value K2

When the torque ratio RT is at least the second threshold value K2, the electric-insulation-performance determining portion 84 outputs, to the hybrid control portion 82, a command for reducing the applied currents Img1, Img2 applied to the respective first and second electric motors MG1, MG2. In response to the command, the hybrid control portion 82 outputs, to the inverter 76, the motor control command signal Smg for reducing the applied currents Img1, Img2 applied to the respective first and second electric motors MG1, MG2, so that the leakage of the electric current into the oil is reduced and accordingly the electrical short and spark are reduced whereby the oil is prevented from being abnormally heated.

Further, also in a case in which the torque ratio RT is at least the second threshold value K2, the notification portion 86 notifies the vehicle driver that the oil whose insulation performance is low is being used, namely, the electric insulation performance of the oil is low, by using the warning light 88 and the sounding device 90, for example. Moreover, in the case in which the torque ratio RT is at least the second threshold value K2, the notification portion 86 may notify that the driving performance will be reduced as a result of reductions of the applied currents Img1, Img2 applied to the respective first and second electric motors MG1. MG2.

Figure 2:
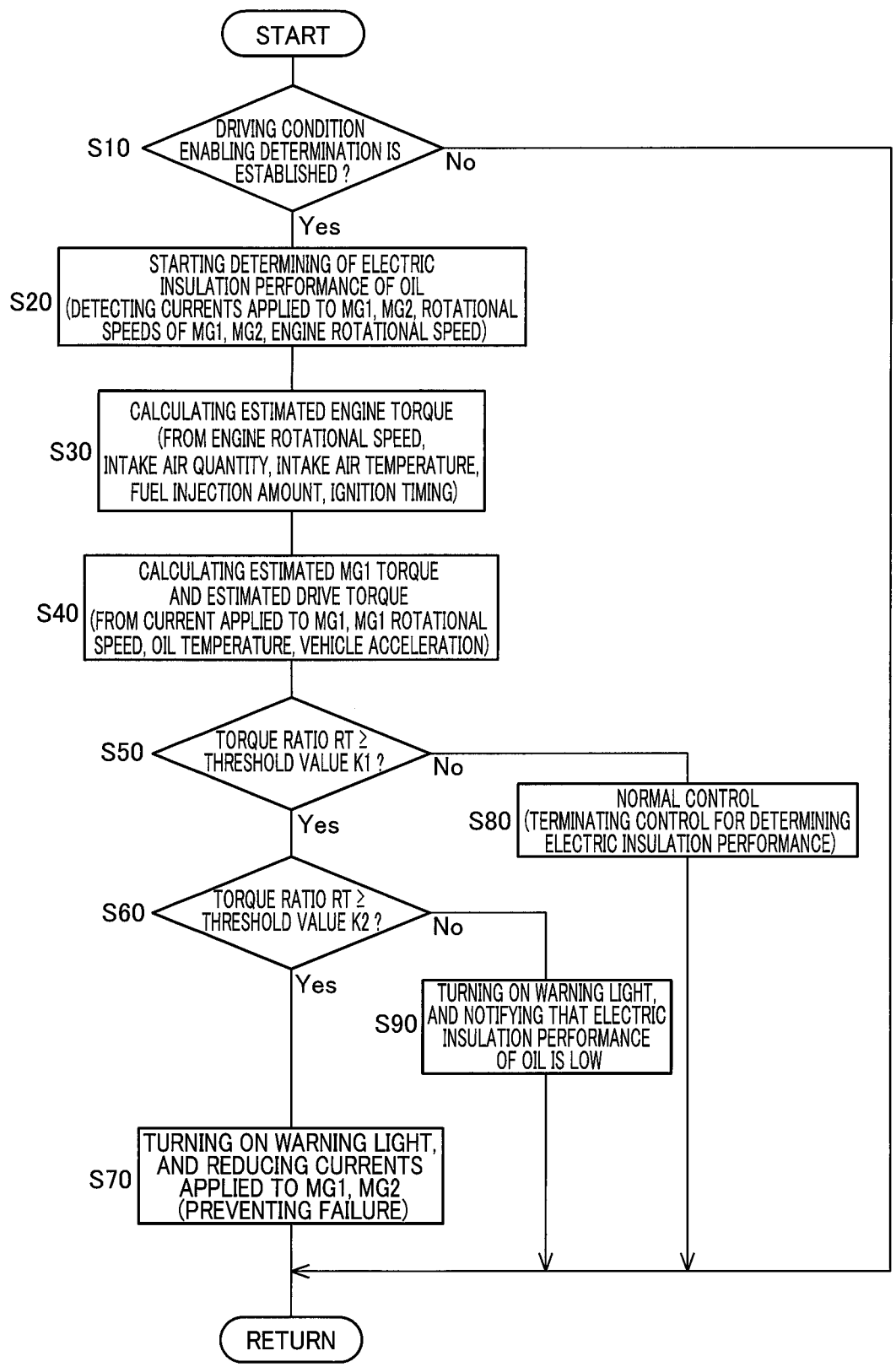
FIG. 2 is a flow chart showing a control routine executed by an electronic control apparatus shown in FIG. 1.

FIG. 2 is a flow chart showing a control routine executed by the electronic control apparatus 80, for determining whether the electric insulation performance of the oil used in the power transmission apparatus 10 is low or not. This control routine is executed, for example, each time when the oil stored in the casing 40 is changed.

As shown in FIG. 2, the control routine is initiated with step S10 corresponding to control function of the electric-insulation-performance determining portion 84, which is implemented to determine whether the driving condition enabling determination of the electric insulation performance of the oil is established or not. When a negative determination is made at step S10, one cycle of execution of the control routine is terminated. When an affirmative determination is made at step S10, step S20 corresponding to control function of the electric-insulation-performance determining portion 84 is implemented to start a determination control for determining the electric insulation performance of the oil, thereby detecting values such as the applied current Img applied to each of the electric motors MG, the MG rotational speed Nmg of each of the electric motors MG and the engine rotational speed Ne of the engine 12. Then, step S30 corresponding to control function of the electric-insulation-performance determining portion 84 is implemented to calculate the estimated engine torque Teest of the engine 12, based on the engine rotational speed Ne and the operation state of the engine 12 (such as an intake air quantity Qair, an intake air temperature Tair, a fuel injection amount M and an ignition timing Tig) that is detected by the engine-state detection sensor 68. Then, step S40 corresponding to control function of the electric-insulation-performance determining portion 84 is implemented to calculate the estimated MG1 torque Tmg1est of the first electric motor MG1 and the estimated drive torque Tdest of the counter drive gear 14. Step S40 is followed by step S50 corresponding to control function of the electric-insulation-performance determining portion 84, which is implemented to calculate the torque ratio RT by applying the estimated engine torque Teest (calculated at step S30) and the estimated MG1 torque Tmg1est and estimated drive torque Tdest (calculated at step S40), to the above formula (2), and to determine whether the calculated torque ratio RT is at least the first threshold value K1 or not. When a negative determination is made at step S50, it is determined that the electric insulation performance of the oil is appropriate and the control flow goes to step S80 corresponding to control function of the electric-insulation-performance determining portion 84, which is implemented to terminate the determination control for determining the electric insulation performance of the oil, and to return to a normal control. When an affirmative determination is made at step S50, step S60 corresponding to control function of the electric-insulation-performance determining portion 84 is implemented to determine whether the torque ratio RT is at least the second threshold value K2 or not. When a negative determination is made at step S60, namely, when the torque ratio RT is not lower than the first threshold value K1 but is lower than the second threshold value K2, the control flow goes to step S90 corresponding to control function of the notification portion 86, which is implemented to turn on the warning light 88 for notifying the vehicle driver that the oil whose insulation performance is low is being used. When an affirmative determination is made at step S60, namely, when the torque ratio RT is not lower than the second threshold value K2, step S70 corresponding to control function of the notification portion 86 is implemented to turn on the warning light 88 for notifying the vehicle driver that the oil whose insulation performance is low is being used, and also to reduce the applied current Img applied to each of the electric motors MG, for preventing the oil from being abnormally heated.

As described above, in the present embodiment, the electric insulation performance of the oil is determined by the electric-insulation-performance determining portion 84, and the determined electric insulation performance of the oil is notified by the notification portion 86 to the vehicle driver, so that the driver can grasp whether the electric insulation performance of the oil is appropriate or not.

There will be described other embodiments of this invention. The same reference signs as used in the above-described embodiment will be used in the following embodiment, to identify the practically corresponding elements, and descriptions thereof are not provided.

Second Embodiment

Figure 3:
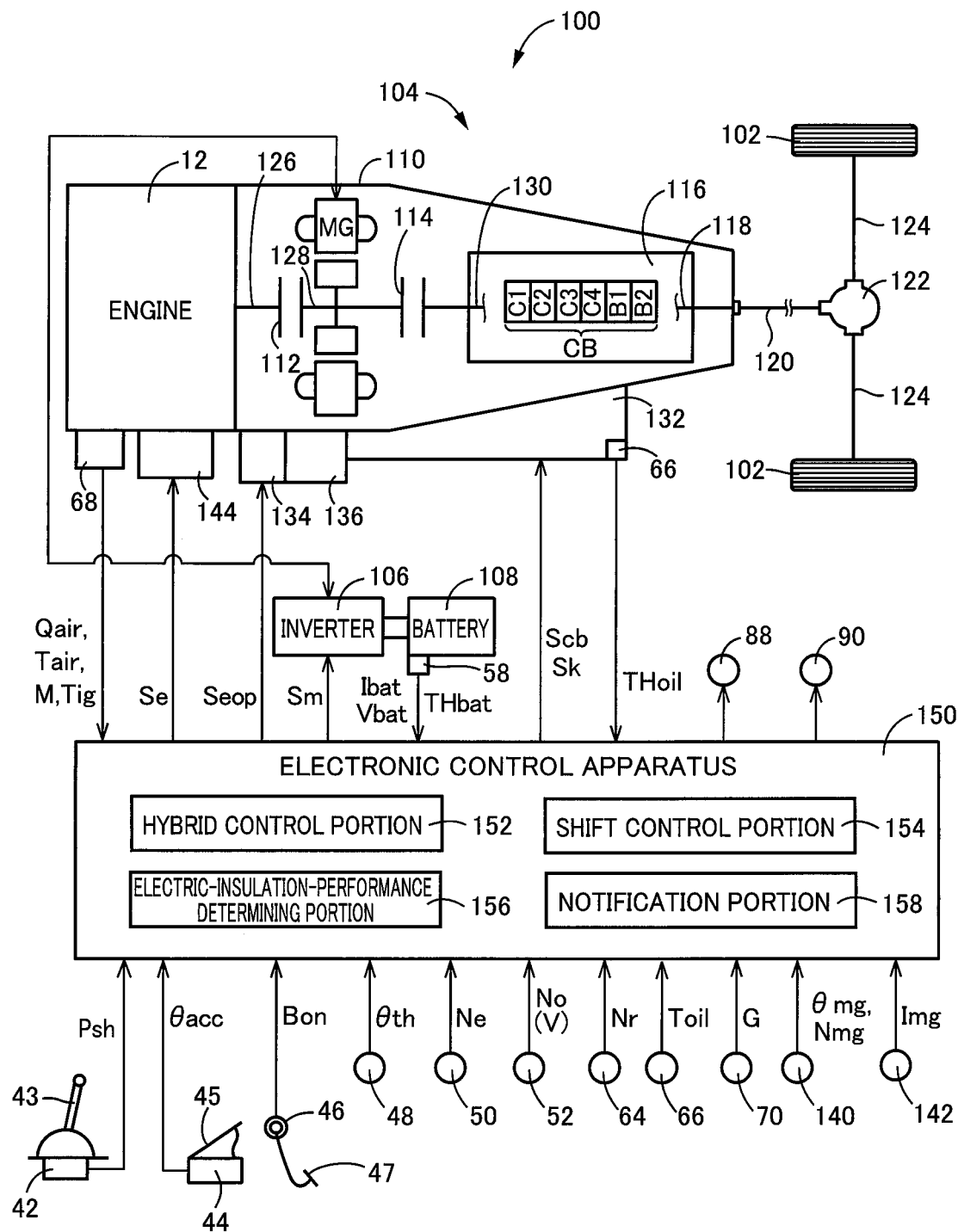
FIG. 3 is a view schematically showing a construction of a vehicle according to another embodiment of the present invention, and is also a functional block diagram explaining a control system and control functions for performing various controls in the vehicle.

FIG. 3 is a view schematically showing a construction of a vehicle 100 according to another embodiment of the present invention, and is also a functional block diagram explaining a control system and control functions for performing various controls in the vehicle 100. As shown in FIG. 3, the vehicle 100 is a hybrid electric vehicle including an engine 12 and an electric motor MG as power sources for driving the vehicle 100, and a power transmission apparatus 104 configured to transmit powers of the engine 12 and the electric motor MG toward drive wheels 102 of the vehicle 100. The engine 12 is substantially the same as that in the above-described embodiment, so that the same reference sign is given thereto and its description is not provided.

The electric motor MG is connected to a battery 108 provided in the vehicle 100, through an inverter 106 provided in the vehicle 100. With the inverter 106 being controlled by an electronic control apparatus 150, an MG torque Tmg as an output torque of the electric motor MG is controlled.

The power transmission apparatus 104 includes a casing 110 as a non-rotary member attached to a body of the vehicle 100, a first clutch 112, a second clutch 114 and an automatic transmission 116, wherein the first and second clutches 112, 114 and the automatic transmission 116 are disposed within the casing 110. The first clutch 112 is a clutch disposed between the engine 12 and the electric motor MG in a power transmission path between the engine 12 and the drive wheels 102. The second clutch 114 is a clutch disposed between the first clutch 112 and the automatic transmission 116 in the power transmission path between the engine 12 and the drive wheels 102.

The automatic transmission 116 is disposed between the second clutch 114 and the drive wheels 102 in the power transmission path. The power transmission apparatus 104 further includes a propeller shaft 120 connected to a transmission output shaft 118 that is an output rotary member of the automatic transmission 116, a differential gear device 122 connected to the propeller shaft 120, and right and left axles 124 connected to the differential gear device 122. The power transmission apparatus 104 still further includes an engine connecting shaft 126 connecting between the engine 12 and the first clutch 112, an electric-motor connecting shaft 128 connecting between the first and second clutches 112, 114, and a transmission input shaft 130 connecting between the second clutch 114 and the automatic transmission 116.

The automatic transmission 116 is a known automatic transmission of a planetary gear type which includes at least one planetary gear device (not shown) and an engagement device CB. The engagement device CB includes, for example, a plurality of hydraulically-operated frictional coupling devices each of which is a multiple-disc type or a single-disc type clutch or brake that is to be pressed by a hydraulic actuator, or a band brake that is to be tightened by a hydraulic actuator. Each of the coupling devices of the engagement device CB is configured to receive a CB hydraulic pressure PRcb that is a regulated hydraulic pressure supplied from a hydraulic control unit (hydraulic control circuit) 132, whereby a CB torque Tcb, i.e., torque capacity of each of the coupling devices of the engagement device CB is changed so that a control or operation state of the engagement device CB is switched between an engaged state and a released state, for example. The engagement device CB includes, for example, four clutches C1-C4 and two brakes B1, B2 as the coupling devices. The automatic transmission 116 is configured to establish a selected one of a plurality of gear positions, with a corresponding one or ones of the coupling devices of the engagement device CB being engaged.

Each of the first and second clutches 112, 114 is a frictional engagement device constituted by a multiple-disc type or single-disc type clutch that is to be operated by a hydraulic actuator, wherein the clutch may be of either wet type or dry type, for example. A control or operation state of each of the first and second clutches 112, 114 is to be switched among an engaged state, a slipping state and a released state, with an operation state of the hydraulic actuator being controlled by the electronic control apparatus 150.

With the first clutch 112 being engaged, the engine 12 and the electric motor MG are connected to the power transmission path through the first clutch 112. With the second clutch 114 being engaged, the electric motor MG and the automatic transmission 116 are connected to the power transmission path through the second clutch 114. For example, when the first and second clutches 112, 114 are both engaged, the engine 12 and the electric motor MG are both connected to the drive wheels 102 through the automatic transmission 116, for example, in a power transmittable manner, so that the vehicle 100 can perform a hybrid running with the powers of the engine 12 and the electric motor MG. Further, when the second clutch 114 is engaged while the first clutch 112 is released, the electric motor MG and the drive wheels 102 are connected in a power transmittable manner while transmission of the power of the engine 12 is cut off, so that the vehicle 100 can perform a motor running with the power of the electric motor MG.

The vehicle 100 is provided with an electrically-operated oil pump 136 that is to be driven by a pump motor 134, and also a mechanically-operated oil pump (not shown) that is to be driven by the engine 12 and/or the electric motor MG. A working fluid outputted from the electrically-operated oil pump 136 and the mechanically-operated oil pump is supplied to the hydraulic control unit 132. The hydraulic control unit 132 receives the working fluid outputted from the electrically-operated oil pump 136 and/or the mechanically-operated oil pump, and regulates the received working fluid, so as to output regulated hydraulic pressures, wherein the outputted regulated hydraulic pressures include the CB hydraulic pressure PRcb supplied to each one of the coupling devices of the engagement device CB, a first hydraulic pressure PRk1 supplied to the first clutch 112 and a second hydraulic pressure PRk2 supplied to the second clutch 114.

The electronic control apparatus 150, which is provided for performing various controls in the vehicle 100, receives various output signals based on values detected by respective sensors provided in the vehicle 100. The same reference signs as used in the above-described first embodiment will be used in this second embodiment, to identify the practically corresponding output signals, and descriptions thereof are not provided. In this second embodiment, the electronic control apparatus 150 receives an output signal of a resolver 140 indicative of a rotational angle θmg and an MG rotational speed Nmg the electric motor MG1, and an output signal of a current sensor 142 indicative of an applied current Img applied to the electric motor MG.

The electronic control apparatus 150 outputs various output signals to the various devices provided in the vehicle 100, such as: an engine control command signal Se that is to be supplied to an engine control device 144 for controlling the engine 12; an MG control command signal Sm that is to be supplied to the inverter 106 for controlling the electric motor MG; a CB hydraulic control command signal Scb that is to be supplied to the hydraulic control unit 132 for controlling the engagement device CB; a hydraulic control command signal Sk that is to be supplied to the hydraulic control unit 132 for controlling the first and second clutches 112, 114; and a pump control command signal Seop that is to be supplied to the pump motor 134 for controlling the electrically-operated oil pump 136.

For performing various controls in the vehicle 100, the electronic control apparatus 150 includes hybrid control means in the form of a hybrid control portion 152, shift control means in the form of a shift control portion 154, electric-insulation-performance determining means in the form of an electric-insulation-performance determining portion 156, and notification means in the form of a notification portion 158.

The hybrid control portion 152 is configured to selectively establish one of a motor driving mode and an engine driving mode, depending upon a running state of the vehicle 100. In the motor driving mode, only the electric motor MG is used as the power source to cause the vehicle 100 to run while the engine 12 is stopped. In the engine driving mode, only the engine 12 is used as the power source to cause the vehicle 100 to run.

The shift control portion 154 is configured to select one of the gear positions that corresponds to the driving state of the vehicle 100, for example, based on the accelerator opening degree θacc and the running speed V, and to output, to the hydraulic control unit 132, the CB hydraulic control command signal Scb for establishing the selected one of the gear positions.

When the driving condition enabling determination of the electric insulation performance of the oil is established during running of the vehicle 100, the electric-insulation-performance determining portion 156 starts the determination control for determining the electric insulation performance of the oil. The electric-insulation-performance determining portion 156 determines that the driving condition enabling determination of the electric insulation performance of the oil is established, for example, when a part of the power of the engine 12 is transmitted to the electric motor MG to generate the electric power during running of the vehicle 100 in the engine driving mode with the first and second clutches 112, 114 being both engaged. In this instance, the power of the engine 12 is distributed to the electric motor MG and the transmission input shaft 130, so that formula (4) given below is satisfied. In the formula (4), "Tmg" represents the MG torque Tmg of the electric motor MG, and "Tin" represents an input torque Tin that is a torque inputted to the transmission input shaft 130. In other words, the electric-insulation-performance determining portion 156 determines whether the vehicle 100 is in a driving state satisfying the formula (4) or not, when the determination control for determining the electric insulation performance of the oil is to be started.

$$Te = Tmg + Tin \quad (4)$$

Further, when the driving condition enabling determination of the electric insulation performance of the oil is established, the electric-insulation-performance determining portion 156 calculates the torque ratio RT in accordance with formula (5) given below. In the formula (5), "Tmgest" represents an estimated MG torque Tmgest that is an estimated value of the MG torque Tmg of the electric motor MG, "Tinest" represents an estimated input torque Tinest that is an estimated value of the input torque Tin, and "estimated engine torque Teest" that is an estimated value of the engine torque Te of the engine 12. In the formula (5), the torque ratio RT is calculated by dividing a sum of the estimated MG torque Tmgest and the estimated input torque Tinest by the estimated engine torque Teest.

$$RT = (Tmgest + Tinest)/Teest \quad (5)$$

The estimated MG torque Tmgest in the formula (5) is calculated based on the MG rotational speed Nmg detected by the resolver 140 and the applied current Img detected by the current sensor 142. The estimated engine torque Teest in the formula (5) is estimated from the above-described intake air quantity Qair, intake air temperature Tair, fuel injection amount M and ignition timing Tig, as in the above-describe first embodiment. The estimated input torque Tinest in the formula (5) is calculated, for example, by applying the current longitudinal acceleration G and the current gear ratio γat of the automatic transmission 116, to a predefined relationship map or relationship formula for estimating the input torque Tin based on the longitudinal acceleration G and the current gear ratio γat of the automatic transmission 116.

The electric-insulation-performance determining portion 156 calculates the torque ratio RT based on the formulas (4), (5), and determines whether the electric insulation performance of the oil is low or not, based on the calculated torque ratio RT. Where the electric insulation performance of the oil is high, the leakage of the electric current is small, so that the sum of the estimated MG torque Tmgest and the estimated input torque Tinest is equal or substantially equal to the estimated engine torque Teest. That is, the torque ratio RT is 1.0 or is a value close to 1.0. On the other hand, when the electric insulation performance of the oil is low, the leakage of the electric current is increased, so that the actual MG torque Tmg is reduced while the estimated MG torque Tmgest estimated based on the applied current Img is not changed. Therefore, as the leakage of the electric current is increased, the sum of the estimated MG torque Tmgest and the estimated input torque Tinest relative to the estimated engine torque Teest is increased. Further, since the estimated engine torque Teest is not changed, when the electric insulation performance of the oil is low, the torque ratio RT is higher than 1.0, and is increased as the electric insulation performance is reduced. Thus, it is possible to determine whether the oil whose insulation performance is low is being used or not, based on the torque ratio RT calculated in accordance with the formula (5). It is noted that the control operation of the electric-insulation-performance determining portion 156 after calculation of the torque ratio RT is substantially the same as that of the electric-insulation-performance determining portion 84 in the above-described first embodiment, so that its description is not provided. Further, the control function of the notification portion 158 is substantially the same as that of the notification portion 86 in the above-described first embodiment, so that its description is not provided.

As described above, also in the one-motor type hybrid electric vehicle 100, it is possible to determine whether the electric insulation performance of the oil is low or not, by the control operation of the electric-insulation-performance determining portion 156, and to notify the vehicle driver that the electric insulation performance of the oil is low by the control operation of the notification portion 158 where the electric insulation performance is low.

Third Embodiment

Figure 4:
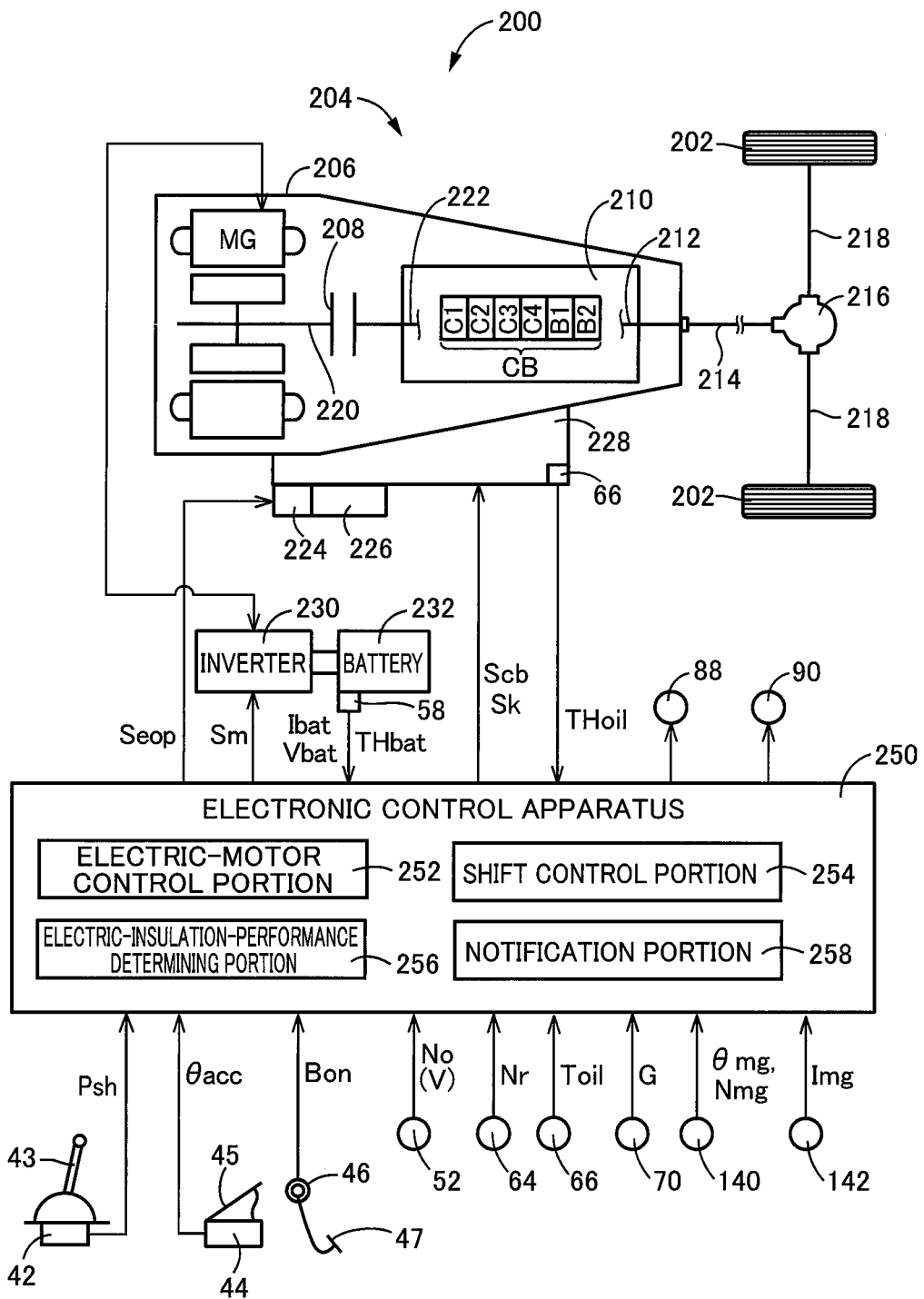
FIG. 4 is a view schematically showing a construction of a vehicle according to still another embodiment of the present invention, and is also a functional block diagram explaining a control system and control functions for performing various controls in the vehicle.

FIG. 4 is a view schematically showing a construction of a vehicle 200 according to still another embodiment of the present invention, and is also a functional block diagram explaining a control system and control functions for performing various controls in the vehicle 200. As shown in FIG. 4, the vehicle 200 is an electric vehicle including only electric motor MG as a power source for driving the vehicle 200, and a power transmission apparatus 204 configured to transmit a power of the electric motor MG toward drive wheels 202 of the vehicle 200.

The power transmission apparatus 204 includes a casing 206 as a non-rotary member attached to a body of the vehicle 200, a connection/disconnection clutch 208 and an automatic transmission 210, wherein the connection/disconnection clutch 208 and the automatic transmission 210 are disposed within the casing 206. The connection/disconnection clutch 208 is disposed between the electric motor MG and the automatic transmission 210 so as to selectively connect and disconnect the power transmission path between the electric motor MG and the automatic transmission 210.

The electric motor MG is connected to a battery 232 provided in the vehicle 200, through an inverter 230 provided in the vehicle 200. With the inverter 230 being controlled by an electronic control apparatus 250, an MG torque Tmg as an output torque of the electric motor MG is controlled.

Like the automatic transmission 116 in the above-described second embodiment, the automatic transmission 210 is a known automatic transmission of a planetary gear type which includes at least one planetary gear device (not shown) and an engagement device CB, wherein the engagement device CB includes a plurality of hydraulically-operated frictional coupling devices, for example. A detailed description of the automatic transmission 210 is not provided.

The power transmission apparatus 204 further includes a propeller shaft 214 connected to a transmission output shaft 212 of the automatic transmission 210, a differential gear device 216 connected to the propeller shaft 214, and right and left axles 218 connected to the differential gear device 216. The power transmission apparatus 204 still further includes an electric-motor connecting shaft 220 connected to the electric motor MG, and a transmission input shaft 222 and the above-described output shaft 212 of the automatic transmission 210.

The connection/disconnection clutch 208 is a frictional engagement device constituted by a multiple-disc type or single-disc type clutch that is to be operated by a hydraulic actuator, wherein the clutch may be of either wet type or dry type, for example. A control or operation state of the connection/disconnection clutch 208 is to be switched among an engaged state, a slipping state and a released state, with an operation state of the hydraulic actuator being controlled by the electronic control apparatus 250.

When the connection/disconnection clutch 208 is engaged, for example, the power of the electric motor MG can be transmitted to the drive wheels 202 through the automatic transmission 210, so that the vehicle 200 can perform a motor running with the power of the electric motor MG. On the other hand, when the connection/disconnection clutch 208 is released, the power transmission between the electric motor MG and the drive wheels 202 is cut off.

The vehicle 200 is provided with an electrically-operated oil pump 226 that is to be driven by a pump motor 224, and also a mechanically-operated oil pump (not shown) that is to be driven by the electric motor MG. A working fluid outputted from the electrically-operated oil pump 226 and the mechanically-operated oil pump is supplied to a hydraulic control unit (hydraulic control circuit) 228. The hydraulic control unit 228 receives the working fluid outputted from the electrically-operated oil pump 226 and/or the mechanically-operated oil pump, and regulates the received working fluid, so as to output regulated hydraulic pressures, wherein the outputted regulated hydraulic pressures include the CB hydraulic pressure PRcb supplied to each one of the coupling devices of the engagement device CB, and a connection/disconnection hydraulic pressure PRk supplied to the connection/disconnection clutch 208.

The electronic control apparatus 250, which is provided for performing various controls in the vehicle 200, receives various output signals based on values detected by respective sensors provided in the vehicle 200. The same reference signs as used in the above-described second embodiment will be used in this third embodiment, to identify the practically corresponding output signals, and descriptions thereof are not provided. In this third embodiment in which the engine 12 is not provided, the crank position sensor 50 and the engine-state detection sensor 68 are not provided.

The electronic control apparatus 250 outputs various output signals to the various devices provided in the vehicle 200, such as: an MG control command signal Sm that is to be supplied to the inverter 230 for controlling the electric motor MG; a CB hydraulic control command signal Scb that is to be supplied to the hydraulic control unit 228 for controlling the engagement device CB; a hydraulic control command signal Sk that is to be supplied to the hydraulic control unit 228 for controlling the connection/disconnection clutch 208; and a pump control command signal Seop that is to be supplied to the pump motor 224 for controlling the electrically-operated oil pump 226.

For performing various controls in the vehicle 200, the electronic control apparatus 250 includes electric-motor control means in the form of an electric-motor control portion 252, shift control means in the form of a shift control portion 254, electric-insulation-performance determining means in the form of an electric-insulation-performance determining portion 256, and notification means in the form of a notification portion 258.

The electric-motor control portion 252 is configured, for example, in a state in which the connection/disconnection clutch 208 is engaged, to output, to the inverter 230, the MG control command signal for driving the vehicle 200 with the electric motor MG serving as the power source.

The electric-insulation-performance determining portion 256 is configured to determine whether the driving condition enabling determination of the electric insulation performance of the oil is established or not, depending on whether the power of the electric motor MG is transmittable to the drive wheels 202 or not, namely, depending on whether one of the gear positions is established in the automatic transmission 210 with the connection/disconnection clutch 208 being engaged, or not.

When the driving condition enabling determination of the electric insulation performance of the oil is established, the electric-insulation-performance determining portion 256 calculates the torque ratio RT in accordance with formula (6) given below. In the formula (6), "Tmgest" represents an estimated MG torque Tmgest that is an estimated value of the MG torque Tmg of the electric motor MG, and "Tinest" represents an estimated input torque Tinest that is an estimated value of the input torque Tin inputted to the transmission input shaft 222. When the connection/disconnection clutch 208 is being engaged, the electric-motor connecting shaft 220 and the transmission input shaft 222 are connected through the connection/disconnection clutch 208, so that the input torque Tin is equal to the MG torque Tmg as the output torque of the electric motor MG. In the formula (6), the torque ratio RT is calculated by dividing the estimated MG torque Tmgest of the electric motor MG by the estimated input torque Tinest (i.e., the MG torque Tmg of the electric motor MG).

$$RT = Tmgest/Tinest \qquad (6)$$

The estimated MG torque Tmgest in the formula (6) is calculated based on the MG rotational speed Nmg detected by the resolver 140 and the applied current Img detected by the current sensor 142. Further, the estimated input torque Tinest in the formula (6) is calculated, for example, from the longitudinal acceleration G and the gear ratio γat of the automatic transmission 210.

The electric-insulation-performance determining portion 256 calculates the torque ratio RT based on the formula (6), and determines whether the electric insulation performance of the oil is low or not, based on the calculated torque ratio RT. Where the electric insulation performance of the oil is high, the leakage of the electric current is small, so that the estimated MG torque Tmgest and the estimated input torque Tinest are equal or substantially equal to each other. That is, the torque ratio RT is 1.0 or is a value close to 1.0. On the other hand, when the electric insulation performance of the oil is low, the leakage of the electric current is increased, so that the estimated input torque Tinest is reduced relative to the estimated MG torque Tmgest. That is, the torque ratio RT is higher than 1.0, and is increased as the electric insulation performance is reduced. Thus, it is possible to determine whether the oil whose insulation performance is low is being used or not, based on the torque ratio RT calculated in accordance with the formula (6). It is noted that the control operation of the electric-insulation-performance determining portion 256 after calculation of the torque ratio RT is substantially the same as that of the electric-insulation-performance determining portion 84 in the above-described first embodiment, so that its description is not provided. Further, the control function of the notification portion 258 is substantially the same as that of the notification portion 86 in the above-described first embodiment, so that its description is not provided.

As described above, also in the vehicle 200 (electric vehicle) in which only the electric motor MG serves as the power source, it is possible to determine whether the electric insulation performance of the oil is low or not, by the control operation of the electric-insulation-performance determining portion 256, and to notify the vehicle driver that the electric insulation performance of the oil is low by the control operation of the notification portion 258 where the electric insulation performance is low.

While the preferred embodiments of this invention have been described in detail by reference to the drawings, it is to be understood that the invention may be otherwise embodied.

For example, in the vehicle 8 of the above-described first embodiment, the torque ratio RT is calculated in accordance with a relationship defined by a torque equation (i.e., relationship defined by the formula (1)), and the electric insulation performance of the oil is determined based on the calculated torque ratio RT. However, the present invention is not necessarily limited to this arrangement. For example, a torque sensor may be provided for detecting the MG torque Tmg of each of the electric motors MG, such that the torque ratio RT(=Tmgest/Tmg) is calculated from the estimated MG torque Tmgest of each of the electric motors MG estimated from the applied current Img applied to the each of the electric motors MG and the MG torque Tmg of the each of the electric motors MG detected by the torque sensor, and such that whether the electric insulation performance of the oil is low or not is determined based on the thus calculated torque ratio RT.

Further, in the vehicle 100 of the above-described second embodiment, when the formula (4) is satisfied during running of the vehicle 100, the torque ratio RT is calculated, and the electric insulation performance of the oil is determined based on the calculated torque ratio RT. However, the present invention is not necessarily limited to this arrangement. For example, a torque sensor may be provided for detecting the MG torque Tmg of the electric motor MG, such that the torque ratio RT(=Tmgest/Tmg) is calculated from the estimated MG torque Tmgest of the electric motor MG estimated from the applied current Img applied to the electric motor MG and the MG torque Tmg of the electric motor MG detected by the torque sensor, and such that whether the electric insulation performance of the oil is low or not is determined based on the thus calculated torque ratio RT.

Further, in the vehicle 200 of the above-described third embodiment, the estimated input torque Tinest is calculated based on the longitudinal acceleration G of the vehicle 200. However, the present invention is not necessarily limited to this arrangement. For example, a torque sensor may be provided for detecting the MG torque Tmg of the electric motor MG, such that the torque ratio RT(=Tmgest/Tmg) is calculated from the estimated MG torque Tmgest of the electric motor MG estimated from the applied current Img applied to the electric motor MG and the MG torque Tmg of the electric motor MG detected by the torque sensor, and such that whether the electric insulation performance of the oil is low or not is determined based on the thus calculated torque ratio RT.

Further, in the above-described second and third embodiments, each of the automatic transmissions 116, 210 is a known automatic transmission of a planetary gear type which includes at least one planetary gear device (not shown) and an engagement device CB, wherein the engagement device CB includes a plurality of hydraulically-operated frictional coupling devices, for example. However, the present invention is not necessarily limited to this arrangement. For example, each of the automatic transmissions 116, 210 may be a belt-type continuously variable transmission. That is, there are no particular restriction on type of the automatic transmission. In addition, the automatic transmission does not have to be necessarily provided, and the automatic transmission may be replaced by a speed reducer providing a constant gear ration. Moreover, the present invention is applicable also to an arrangement without an automatic transmission.

While the preferred embodiments of this invention have been described in detail by reference to the drawings, it is to be understood the embodiments described above is given for illustrative purpose only, and that the present invention may be embodied with various modifications and improvements which may occur to those skilled in the art.

NOMENCLATURE OF ELEMENTS

8; 100; 200: vehicle
10; 104; 204: power transmission apparatus
12: engine
14: counter drive gear (rotary member)
34: lubrication required portion
36; 102; 202: drive wheel
84; 156; 256: electric-insulation-performance determining portion
86; 158; 258: notification portion
MG: electric motor
MG1: first electric motor (electric motor)
MG2: second electric motor (electric motor)
RT: torque ratio
K1: first threshold value
K2: second threshold value

What is claimed is:
1. A vehicle comprising:
drive wheels;
an electric motor serving as a power source for driving the vehicle;
a power transmission apparatus configured to transmit a power of the electric motor toward the drive wheels;
an electric-insulation-performance determining portion configured to determine an electric insulation performance of an oil supplied to the electric motor and a lubrication required portion of the power transmission apparatus; and
a notification portion configured to notify a driver of the vehicle about the electric insulation performance of the oil which is determined by the electric-insulation-performance determining portion, wherein
the vehicle further comprises, in addition to the electric motor, an engine serving as another power source for driving the vehicle, and
in a driving state of the vehicle in which a power of the engine is distributed to the electric motor and a rotary member that is mechanically connected to the drive wheels, the electric-insulation-performance determining portion is configured to determine that the electric insulation performance of the oil is low when a torque ratio, which is calculated by dividing a sum of an estimated torque of the electric motor and an estimated torque of the rotary member by an estimated torque of the engine, is not lower than a first threshold value that is higher than 1.0.

2. The vehicle according to claim 1,
wherein the notification portion is configured, when the torque ratio is not lower than the first threshold value, to notify the driver of the vehicle that the electric insulation performance of the oil is low.

3. The vehicle according to claim 2,
wherein an applied current applied to the electric motor is reduced when the torque ratio is not lower than a second threshold value that is higher than the first threshold value.

4. A vehicle comprising,
drive wheels;
an electric motor serving as a power source for driving the vehicle;
a power transmission apparatus configured to transmit a power of the electric motor toward the drive wheels;
an electric-insulation-performance determining portion configured to determine an electric insulation performance of an oil supplied to the electric motor and a lubrication required portion of the power transmission apparatus; and
a notification portion configured to notify a driver of the vehicle about the electric insulation performance of the oil which is determined by the electric-insulation-performance determining portion, wherein
the electric-insulation-performance determining portion is configured to determine the electric insulation performance of the oil, from a relationship between an output torque of the electric motor and an estimated torque of the electric motor that is calculated based on an applied current applied to the electric motor.

5. The vehicle according to claim 4,
wherein the electric-insulation-performance determining portion is configured to determine that the electric insulation performance of the oil is low when a torque ratio, which is calculated by dividing the estimated torque of the electric motor by the output torque of the electric motor, is not lower than a first threshold value that is higher than 1.0.

* * * * *